United States Patent
Zhang et al.

(10) Patent No.: US 10,491,528 B2
(45) Date of Patent: Nov. 26, 2019

(54) SELECTIVELY MONITORING A NETWORK OF NETWORK FUNCTION CHAINS BASED ON PROBABILITY OF SERVICE LEVEL AGREEMENT VIOLATION

(71) Applicant: Hewlett Packard Enterprise Development LP, Houston, TX (US)

(72) Inventors: Ying Zhang, Palo Alto, CA (US); Wenfei Wu, Palo Alto, CA (US); Sujata Banerjee, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 401 days.

(21) Appl. No.: 15/336,517

(22) Filed: Oct. 27, 2016

(65) Prior Publication Data

US 2018/0123930 A1    May 3, 2018

(51) Int. Cl.
*H04L 12/851*    (2013.01)
*H04L 12/24*    (2006.01)
*H04L 12/26*    (2006.01)

(52) U.S. Cl.
CPC ...... *H04L 47/2425* (2013.01); *H04L 41/5009* (2013.01); *H04L 41/5038* (2013.01); *H04L 43/10* (2013.01); *H04L 43/08* (2013.01)

(58) Field of Classification Search
None
See application file for complete search history.

(56) References Cited

U.S. PATENT DOCUMENTS

| | | |
|---|---|---|
| 8,578,017 B2 | 11/2013 | Cobb et al. |
| 9,118,601 B2 | 8/2015 | Chouinard et al. |
| 9,300,562 B2 | 3/2016 | Dufour et al. |
| 9,392,010 B2 | 7/2016 | Friedman et al. |

(Continued)

OTHER PUBLICATIONS

Clark et al. 'Self-Adaptive Service Level Agreement Monitoring in Cloud Environments', Journal of Multiagent and Grid Systems, vol. 9 Issue 2, Mar. 2013 [retrieved on Dec. 19, 2018]. Retrieved from the Internet: <URL: http://citeseerx.ist.psu.edu/viewdoc/download?doi=10.1.1.703.1397&rep=rep1&type=pdf>. (Year: 2013).*

(Continued)

*Primary Examiner* — Esther B. Henderson
*Assistant Examiner* — Dae Kim
(74) *Attorney, Agent, or Firm* — Hewlett Packard Enterprise Patent Department (57) ABSTRACT

In some implementations, a method includes conducting, by a network device, a query associated with a network function chain comprising a plurality of switches and middleboxes to verify whether a service performed by the network function chain complies with a Service Level Agreement (SLA); computing, by the network device, based on a result of the query, a difference in metric value between an actual performance metric of a packet passing through a path in the network function chain and an expected performance metric of the packet passing through the path; deriving, by the network device, a probability of SLA violation associated with the path based on the difference in metric value; and selectively monitoring, by the network device, a network of network function chains by monitoring the path for passive performance measurements based on the probability of SLA violation.

20 Claims, 7 Drawing Sheets

(56) References Cited

U.S. PATENT DOCUMENTS

| | | | | |
|---|---|---|---|---|
| 2010/0280861 A1* | 11/2010 | Rossen | ............... | G06Q 10/00 |
| | | | | 705/7.28 |
| 2014/0071832 A1* | 3/2014 | Johnsson | ............ | H04L 43/10 |
| | | | | 370/242 |
| 2015/0156081 A1* | 6/2015 | Chakra | ............ | H04L 41/5006 |
| | | | | 709/224 |
| 2015/0333953 A1* | 11/2015 | Vasseur | ............ | H04L 41/0668 |
| | | | | 370/228 |
| 2016/0254994 A1* | 9/2016 | Bryant | ............ | H04L 43/0829 |
| | | | | 370/392 |
| 2016/0301601 A1 | 10/2016 | Anand et al. | | |
| 2017/0215094 A1* | 7/2017 | Akoum | ............ | H04L 43/026 |
| 2018/0034712 A1* | 2/2018 | Nainar | ............ | H04L 41/5019 |
| 2018/0198716 A1* | 7/2018 | Karthikeyan | ....... | H04L 41/5022 |

OTHER PUBLICATIONS

Gonzalez et al. "SLA success probability assessment in networks with correlated failures", Computer Comm'ns vol. 36 Issue 6, pp. 708-717, Mar. 15, 2013 [retrieved on Jul. 23, 2019]. Retrieved from the Internet: <URL: https://www.sciencedirect.com/science/article/pii/S0140366412002708>. (Year: 2013).*

Align Operations for Network Functions Virtualization Environments, (Research Paper), 2016, 13 Pgs.

Brendan Tschaen et al, SFC-Checker: Checking the Correct Forwarding Behavior of Service Function Chaining, IEE NFV-SDN, Nov. 2016, 7 Pgs.

Network Functions Virtualisation (NFV); Resiliency Requirements, (Research Paper), Jan. 2015, 82 Pgs.

* cited by examiner

SELECTIVELY MONITORING A NETWORK OF NETWORK FUNCTION CHAINS BASED ON PROBABILITY OF SERVICE LEVEL AGREEMENT VIOLATION

BACKGROUND

Service Level Agreement (SLA) compliance verification generally involves verifying network reachability properties and detecting configuration errors. SLA-compliance violations usually are checked via active measurements, which periodically injects probes into the network and computes metrics, such as, delay, delay variation, loss rate, etc., based on the probes. Such active measurements can incur additional overhead to the network. Also, the active measurements often result in issues being discovered after they manifest. On the other hand, passive measurement collects counters from the network passively. It can be coarse-grained and inaccurate.

BRIEF DESCRIPTION OF THE DRAWINGS

The following detailed description references the drawings, wherein.

DETAILED DESCRIPTION

Service Level Agreements (SLAs) generally specify performance assurance metrics, such as, packet loss, delay, jitter, network availability, etc. Failure to meet SLA guarantees by network service providers can result in poor application performance and significant revenue loss. SLA compliance verification generally refers to verifying whether a network function chain in a given configuration can deliver the performance within the SLA bounds.

Currently, network verification has been used to verify network reachability properties and detect configuration errors. Such network verification techniques merely focus on verifying basic connectivity invariants, such as, loop free-ness, isolation, and reachability. However, while connectivity may be a basic guarantee provided by the network, guarantees on performance metrics, such as, latency, packet loss rate, bandwidth, availability, etc., are also important. Verifying these performance properties are generally referred to as SLA verification.

SLA compliance testing generally uses either active measurement or passive measurement. Internet Service Providers (ISPs) often monitors SLAs by an active measurement mechanism, which periodically injects probes into the network. From the probes, the active measurement mechanism computes delay, delay variation, loss rate metrics that are statistically significant. Such active measurement is likely to incur additional overhead to the network. Also, active measurement usually results in problems being discovered after they manifest. Passive measurement, on the other hand, suffers from the inaccuracy due it its aggregated nature.

As used herein, the term "mechanism" generally refers to a component of a system or device to serve one or more functions, including but not limited to, software components, electronic components, electrical components, mechanical components, electro-mechanical components, etc.

In the solution herein, SLA compliance and/or violations are monitored using both active measurement and passive measurement. Moreover, the results of SLA verification is used to choose the correct set of measurements. In particular, the example SLA verification herein involves a two-step SLA compliance checking mechanism that comprises both static verification and online measurements.

Moreover, the example SLA-verifier includes an online SLA monitoring component. With the online SLA monitoring component in the example SLA-verifier, the solution could be used to detect misconfigurations even before deployment. Therefore, even though the traffic and network environment changes dynamically, by analyzing the traffic distribution and the configuration of the network and middleboxes, the example SLA-verifier can identify possible SLA violations using static analysis even before traffic arrives. The static verification and online measurement can be combined to accommodate the inaccuracy in traffic distribution estimation.

Architecture

Figure 1:
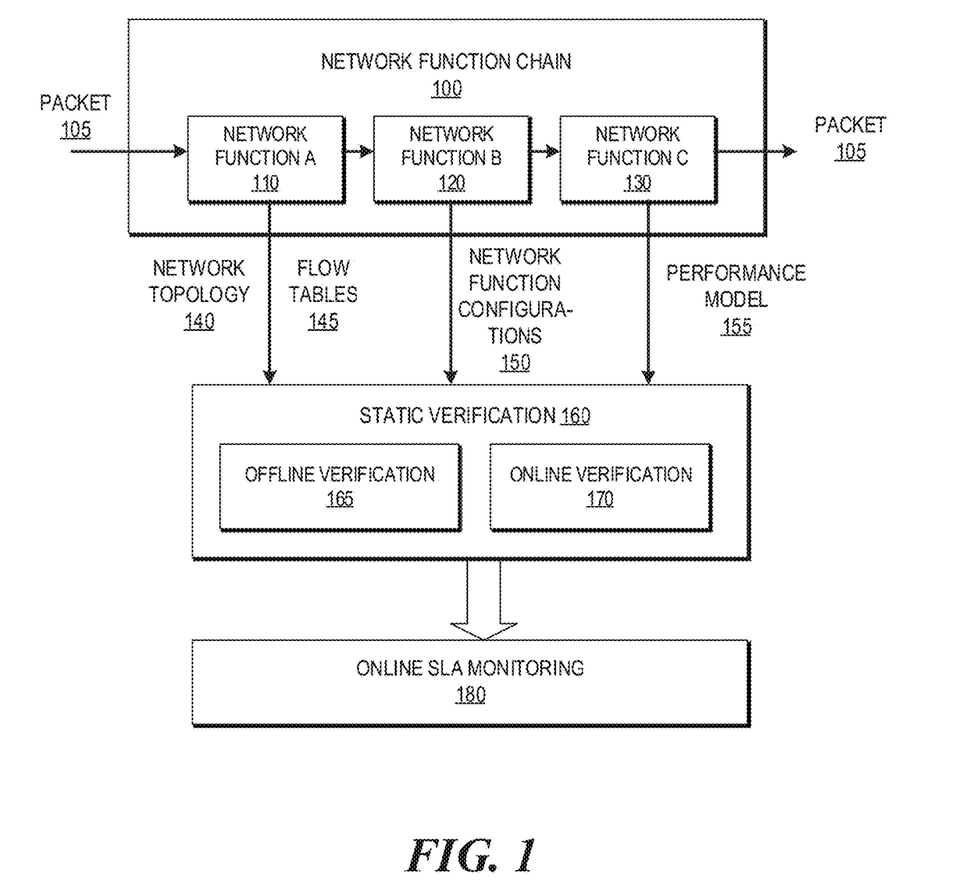
FIG. 1 is a block diagram of an example architecture for selectively monitoring a network of network function chains based on probability of service level agreement (SLA) violation.

FIG. 1 is a block diagram of an example architecture for selectively monitoring a network of network function chains based on probability of service level agreement (SLA) violation. FIG. 1 includes a network function chain 100 that includes a plurality of network functions, such as network, function A 110, network function B 120, network function C 130, etc. A packet 105 in a flow may traverse network function chain 100. The flow may be subject to a SLA. The example architecture includes a SLA-verifier that verifies whether the network function chain meets the expected behavior as specified in the SLA while providing service to the flow, including packet 105.

The SLA-verifier has a static verification module 160 and an online SLA monitoring module 180. Multiple queries can be generated using a query language to inquire network function models by static verification module 160 to determine whether a specified network invariant has a match in a particular network function or network function chain.

The inputs to the SLA-verifier include network topology 140, SDN flow tables 145, Network Function (NF) configurations 150, and the performance model 155 that are generated from historical measurements. Examples of the distribution model include delay distribution and load distribution on each link. For service chaining applications, when flows traverse a sequence of NFs, NF performance models are used to verify the SLA-compliance by the sequence of the NFs. The inputs to the SLA-verifier are described in more details in the section below.

The main component of the SLA-verifier is a static verification module 160. Static verification module 160 includes two sub modules, namely, an offline verification module 165 and an online verification module 170. Offline verification module 165 generally takes a snapshot of the configuration and answers various performance related queries. Furthermore, offline verification module 165 checks if there is any SLA violation given the current configuration.

Using the offline analysis results, online verification module 170 builds a quantitative forwarding graph (QFG). At run time, upon any configuration or routing changes, online verification module 170 uses the quantitative forwarding graph to identify whether the changes in configurations or routes lead to an SLA violation. In one example, a minimum bandwidth guarantee may not be met because of a misconfiguration of rate limiters, or classifying a flow into a low priority class, or mistakenly allocating a smaller than specified amount of bandwidth to the virtual links. In network function virtualization (NFV) scenarios, the selection of Virtualized Network Function (VNF) locations for a particular network function chain could be sub-optimal. For example, assuming that one VNF is in one datacenter or Point of Presence (PoP) and the next VNF in the same network function chain is in another PoP. If the propagation delay between the two PoPs is larger than the latency guarantee, then the latency clause in the SLA will not be satisfied even if none of the nodes along the path is congested.

Note that the SLA-verifier may find a path that has not violated the SLA yet, but could have a high probability of violating the SLA when the traffic dynamics change. This is because the traffic or performance distribution input to the SLA-verifier may not be accurate. Therefore, static verification module 160 is coupled with an online SLA monitoring module 180. Online SLA monitoring module 180 may use the verification results to allocate the monitoring resources and to improve the probability of detecting SLA violations.

Verification Assisted SLA Monitoring

Figure 2:
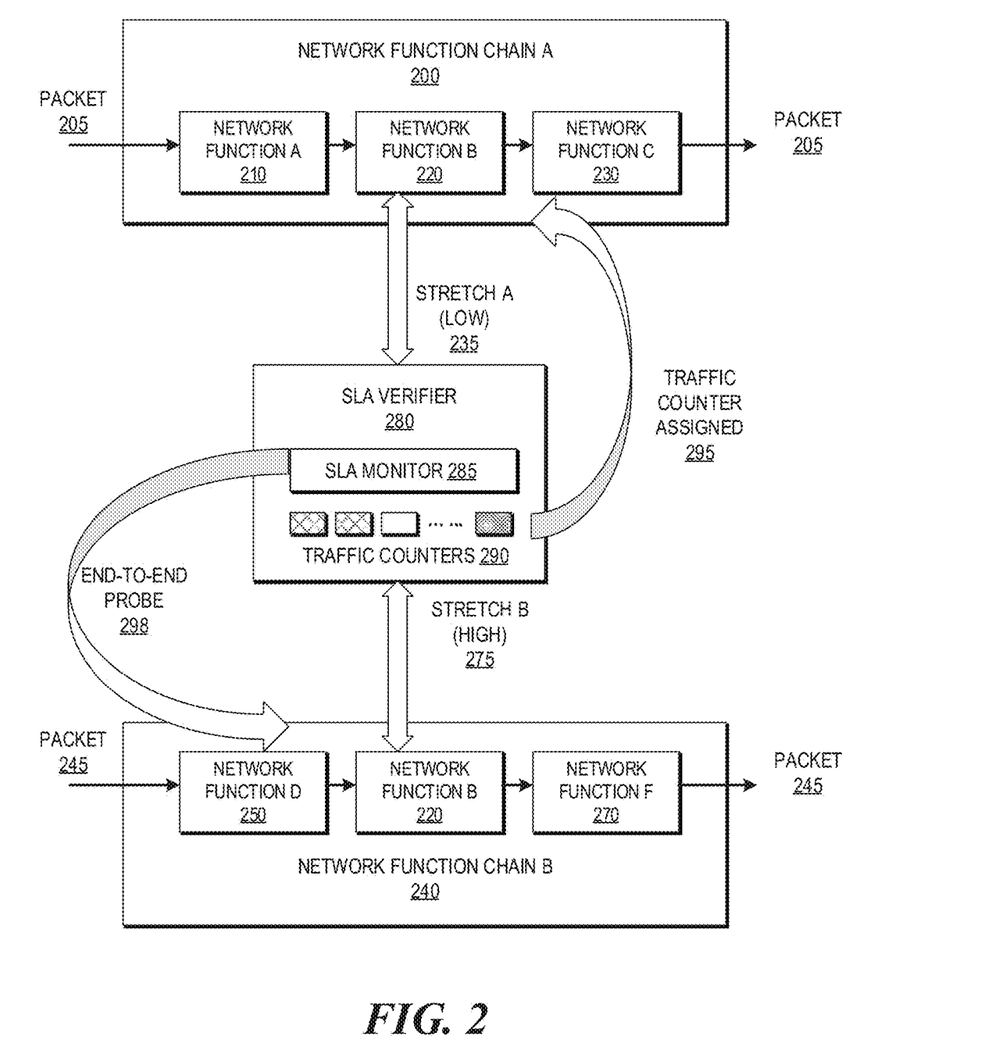
FIG. 2 is a block diagram illustrating example selectively monitoring a network of network function chains based on probability of service level agreement (SLA) violation.

FIG. 2 is a block diagram illustrating example selectively monitoring a network of network function chains based on probability of service level agreement (SLA) violation. Specifically, FIG. 2 includes two different network function chains, e.g., network function chain A 200 and network function chain B 240, both of which pass through network function B 220. For illustration purposes, network function chain A includes network function A 210, network function B 220, and network function C 230. Network function chain B 240 includes network function D 250, network function B 220, and network function F 270.

Here, network functions generally refer to any building blocks of virtualized network node functions that may be connected or chained together to create and provide various network services. For example, network functions may include virtualized load balancers, firewalls, intrusion detection devices, injection detection systems, WAN accelerators, etc. A network function chain generally refers to a set of network functions being chained together to provide network services. For example, a network function chain may include a particular firewall, zero or more switches, a particular injection detection system, followed by zero or more switches, and a load balancer.

Different network function chains may share the same network function (e.g., network function B 220) that is provided by the same set of network nodes. Each network node refers to at least one physical network device that includes a plurality of hardware traffic counters. Each traffic counter can be assigned to measure a particular performance metric for a particular flow to evaluate real-time network performance.

Different traffic flows can pass through different network function chains. In the example illustrated in FIG. 2, packet 205 from a first flow passes through network function chain A 200, and packet 245 from a second and different flow passes through network function chain B 240, Moreover, different flows can be subject to different service level agreements (SLAB), and therefore correspond to different network performance expectations.

A SLA verifier 280 generally refers to a module that receives inputs, including network topology, SDN flow tables, the network function (NF) configurations, and the performance model generated from historical measurements. Then, SLA verifier 280 can answer any performance-related queries, and check whether there is any SLA violation given a configuration. However, because the traffic change is dynamic and the performance distribution input received by SLA verifier 280 may not be accurate, SLA verifier 280 further includes a SLA monitor 285. In some implementations, SLA monitor 285 may be coupled with SLA verifier 280 instead of included in SLA verifier 280. SLA monitor 285 generally refers to an online monitoring module that uses the SLA verification results to monitor network resources and increase the probability of detecting SLA violations by a network function chain.

A. Measurement

Results of the SLA verifier 280 may include per-flow performance metrics. The SLA verification results corresponding to each network function chain are received by SLA monitor 285. In addition, multiple measurement techniques can be used to monitor SLA violations, because traffic dynamics cannot be solely discovered by static verification.

Types of measurements may include, for example, active end-to-end measurement and software defined network (SDN) based passive measurement. In active end-to-end measurement, SLA monitor 285 actively injects probes into the network, such as ping, traceroute, bandwidth measurement, to measure the network performance in real time. Active measurements generally have good accuracy to measure the dynamic performance of the network. However, active probes can introduce overhead to both end hosts and the network. For example, the rate that routers and/or switches react to an Internet Control Message Protocol (ICMP) packet is constrained. Thus, SLA verifier 280 can selectively choose to use active measurement.

On the other hand, counters reported by each switch along the path can be used for passive measurement. However, it is often coarse-grained and is also limited by the switch's available rule space. In SDN-based passive measurement, SLA verifier 280 installs rules on SDN switches to passively collect performance metrics, such as, packet drops, packet counts, byte counts, etc. These performance metrics can be collected using hardware traffic counters on each network node, and be used to detect performance issues in a network function chain.

Passive measurement does not introduce additional load to the network, but it consumes switch resources. Each node (or switching device) often has a limited number of rules that can be used for measurement (also known as "capacity"). Each rule can also be called a counter in a node. SLA monitor 285 can communicate with each network node in a network function chain, and assign any counter in any node to monitor a particular performance metric for a particular flow.

Since both active measurement and passive measurement are associated with their costs, SLA monitor 285 uses the verification results from SLA verifier 280 to intelligently select a particular measurement to use on a particular location of the network to improve coverage and detection rate. The goal of SLA monitor 285 is to assign a measurement for each path.

To selectively assign the counters, SLA verifier 280 calculates a stretch value for each network function chain and share the stretch value with SLA monitor 285. The stretch is generally calculated as the difference of the performance metric and the expected property to accommodate violations. For example, for a flow with expected bandwidth allocation of 10 Mbps, if SLA verifier 280 verifies bandwidth configuration (e.g., due to QoS policies) to be less than 10 Mbps, then a SLA violation is identified.

However, if the verification result is larger than 10 Mbps due to the dynamic runtime throughput, it is still possible that there exist violations (e.g., due to a burst in traffic). In the event of possible violations, the larger the value of the stretch is, the less the probability of SLA violation is. For example, if the verified QoS bandwidth allocation is 100 Mbps, the bandwidth violation is less likely to happen than an allocation with exact 10 Mpbs.

B. Analysis

Passive measurements are generally preferred over active measurements because passive measurements have light-weighted overhead to the system. However, they have limited resources. For example, there are limited number of traffic counters on a switch. Thus, SLA monitor 285 will attempt to monitor as many flows by passive counters as possible, and monitor the remaining flows using active probing.

Specifically, SLA monitor 285 performs counter-to-flow assignment based on the stretch values computed by SLA verifier 280. For a flow i, the probability of SLA violation is negatively correlated with its stretch. That is, $$P(vi) \propto \frac{1}{Si}$$

If a flow i is not assigned a counter, the probability of detecting a SLA violation is 0. If the flow i owns a counter exclusively, the probability of detecting a SLA violation is 1. If a flow share a counter, the probability of detecting a SLA violation is a conditional probability, where the aggregated flows violate under the condition flow i violates. Therefore, the following equation can be used to calculate the probability of SLA violation:

$$P(Di \mid Vi) = \begin{cases} 0, & \text{flow } i \text{ is not assigned a counter,} \\ 1, & \text{flow } i \text{ exclusively owns a counter,} \\ P(Vs \mid Vi), & \text{flow } i \text{ share a counter with flow set } S \end{cases}$$

The probability $P(V_i)$ can be known by measuring flows performance profile, e.g., throughput or latency distribution in the history. Moreover, $P(V_s|V_i)$ can be obtained by performing a Mento Carlo simulation if probability of SLA violation for flows in set S is known.

Therefore, the counter-to-flow assignment task can be formulated as an optimization problem as shown in Table 1 below.

TABLE 1

Counter-to-flow assignment
Maximize $\Sigma_i P(D_i|V_i)$, such that

| | |
|---|---|
| $x_{ijk} \in \{0, 1\}$ | (1) |
| $\Sigma_{jk} x_{ijk} \leq 1, \forall i$ | (2) |
| $S_{jk} = \{i \mid x_{ijk} = 1, \forall i\}, \forall j, k$ | (3) |
| $\|\{S_{jk}\|S_{jk} \neq \emptyset, \forall k\}\| \leq K, \forall j$ | (4) |

In Table 1, $\{x_{ijk}\}$ are 0-1 variables representing that flow i is assign to the j-th counter on box k. The goal of counter-to-flow assignment by SLA monitor 285 is to increase the probability of detecting SLA violations, with the constraints of reasonable assignment (e.g., constraints (1), (2) and (3) in Table 1) and limited counters per switch (e.g., constraint (4) in Table 1).

This integer program (IP) reveals two basic principles. First, flows with a low stretch should be allocated first to increase the probability of detecting SLA violations. Second, bottleneck nodes on the path should be considered first to satisfy the monitoring resource constraints (e.g., the number of counters). The time complexity for this integer program is NP-hard and the number of flows and boxes monitored by SLA monitor 285 is large. Therefore, in some implementations, SLA monitor can use a heuristic counter assignment below based on the above two principles.

C. Heuristic Counter Assignment

The general idea of the heuristic counter assignment is to make flow with low stretch values share counters and assign the counter on the bottleneck node first for each flow. These two heuristics can increase the likelihood of detecting SLA violations. The monitoring strategy used by SLA monitor 285 is shown in Table 2 below.

TABLE 2

SLA Monitoring Strategy

```
function MONITOR(QFG)
    for p ∈ QFG.paths do
        p.stretch := p.perf - p.expected
    QFG.paths.sort( )
    for p ∈ QFG.paths do
        n := arg min_{n∈p} (n.bw)
        if n.paths < n.capacity then
            n.paths.add(p)
            p.covered := True
            if n.highFreq- ≠ 0 then p.freq := high
            else p.freq := low
    for p ∈ {p | p ∈ QFG.paths and p.covered = False} do
        e2eprobe.add(p)
        if highFreq- ≠ 0 then p.freq := high
        else p.freq := low
```

For illustration purposes, bandwidth is used as an example performance metric here. Using the verification result from SLA verifier 280, SLA monitor 285 first computes the stretch value, which equals the difference between the estimated performance of the network path along a network function chain and the expected performance defined in the SLA. Then, the SLA monitor 285 sorts the paths according to their stretch values in descending order. For each ranked path, the bottleneck node is identified and used for monitoring this particular path. If the node has enough capacity (e.g., enough number of traffic counters), and if the current path is not covered by any existing traffic counter, SLA monitor 285 will assign a rule on the node to measure this path. After the counters in the nodes of a given path are used up, SLA monitor 285 will assign end-to-end (e2e) probes for the remaining paths that still have a high likelihood of violating the SLA.

In the example shown in FIG. 2, SLA verifier 280 calculates a stretch A 235 for the path traversed by packet 205, and a stretch B 275 for the path traversed by packet 245. Assuming that stretch A 235 has a low stretch value, and stretch B 275 has a high stretch value. Because a low stretch value is associated with a high probability of SLA violation, SLA monitor 285 will identify a bottleneck node on the path (e.g., the network node correspond to network function B) and assign an available traffic count on the node to monitor the performance metrics of the path traversed by packet 205. On the other hand, because a high stretch value is associated with a low probability of SLA violation, SLA monitor 285 will assign an end-to-end probe to monitor the performance metrics of the path traversed by packet 245.

As another optimization, each node may satisfy limited polling restrictions for counters, or support a limited number of e2e probes. Therefore, SLA monitor 285 can also assign a measurement frequency for each path. In one example, two levels of frequency, namely a high polling (or probing) frequency and a low polling (or probing) frequency, are used to assign to the paths. Paths with a high probability of SLA violations are assigned with a high polling/probing frequency. If a node's polling/probing frequency quota is used up, the remaining paths would be given a low polling/probing frequency.

Figure 3:
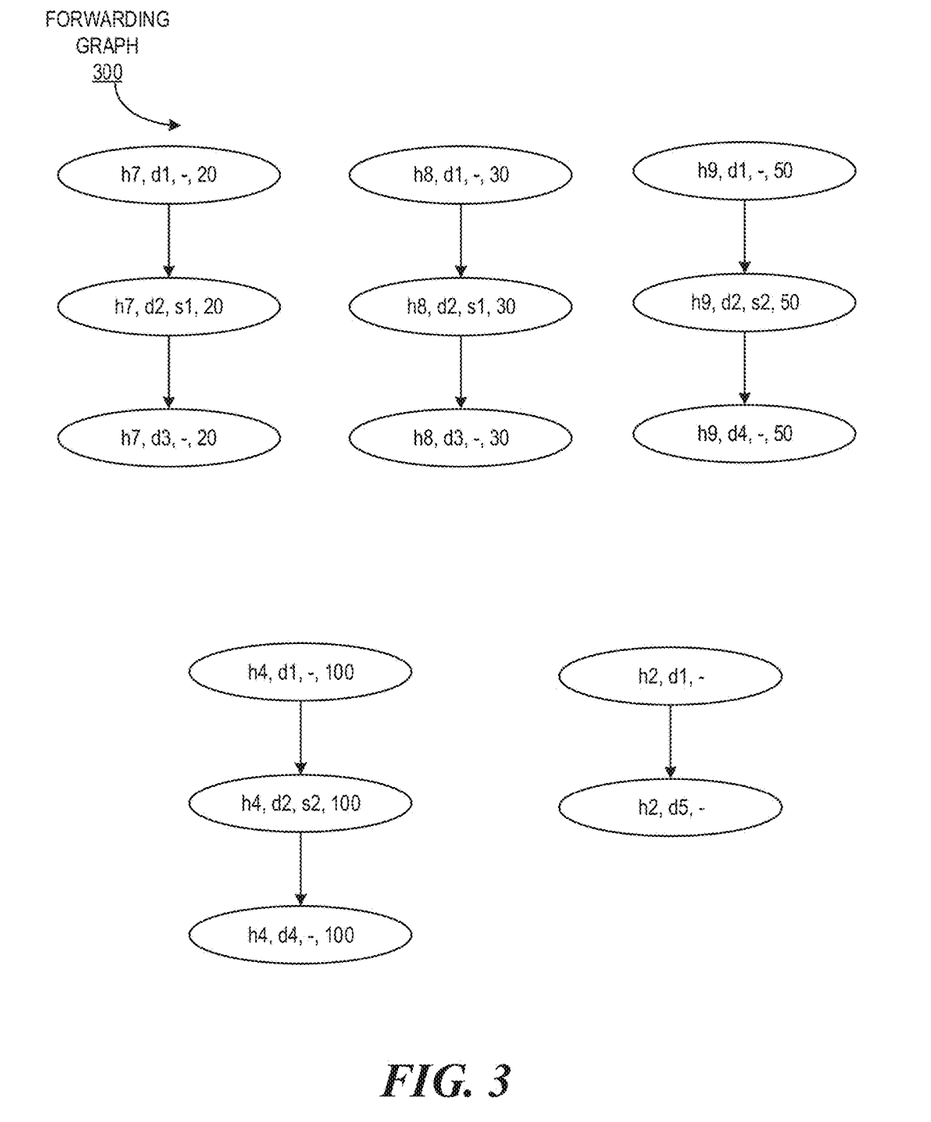
FIG. 3 is a block diagram illustrating an example forwarding graph used to selectively monitor a network of network function chains based on probability of SLA violation.

FIG. 3 illustrates an example forwarding graph 300, which can be a Quantitative Forwarding Graph (QFG) that represents how packets are forwarded, what performance they are getting, and what NF states they change. In forwarding graph 300, each node is denoted as a tuple of packet header space, device, state and performance group, e.g., (H; D; S;G), representing any packet in the packet header space H arriving at a network device (switch or NF) D, when the network device is at a particular state S with performance G.

The forwarding graph 300 can be an example input to SLA monitor. Moreover, SLA monitor can receive additional inputs, such as, the constraints of monitoring capacity at each network node. For illustration purposes, assuming that the network can afford two end-to-end (e2e) probes, because h7 and h8 have a tighter budget compared to their SLAs. Therefore, the SLA monitor may use e2e probes to monitor them. The remaining nodes are covered by assigned traffic counters. In the example illustrated in FIG. 3, both h9 and h4 have bottleneck node d1. Thus, two counters are assigned on d1 to measure the bandwidth of h9 and h4 respectively. Finally, assuming that the QoS corresponding to h2 is the best effort. Therefore, SLA monitor may use d5 to monitor h2, because d2 has the available most resources.

Processes to Selectively Monitor a Network of Network Function Chains

Figure 4:
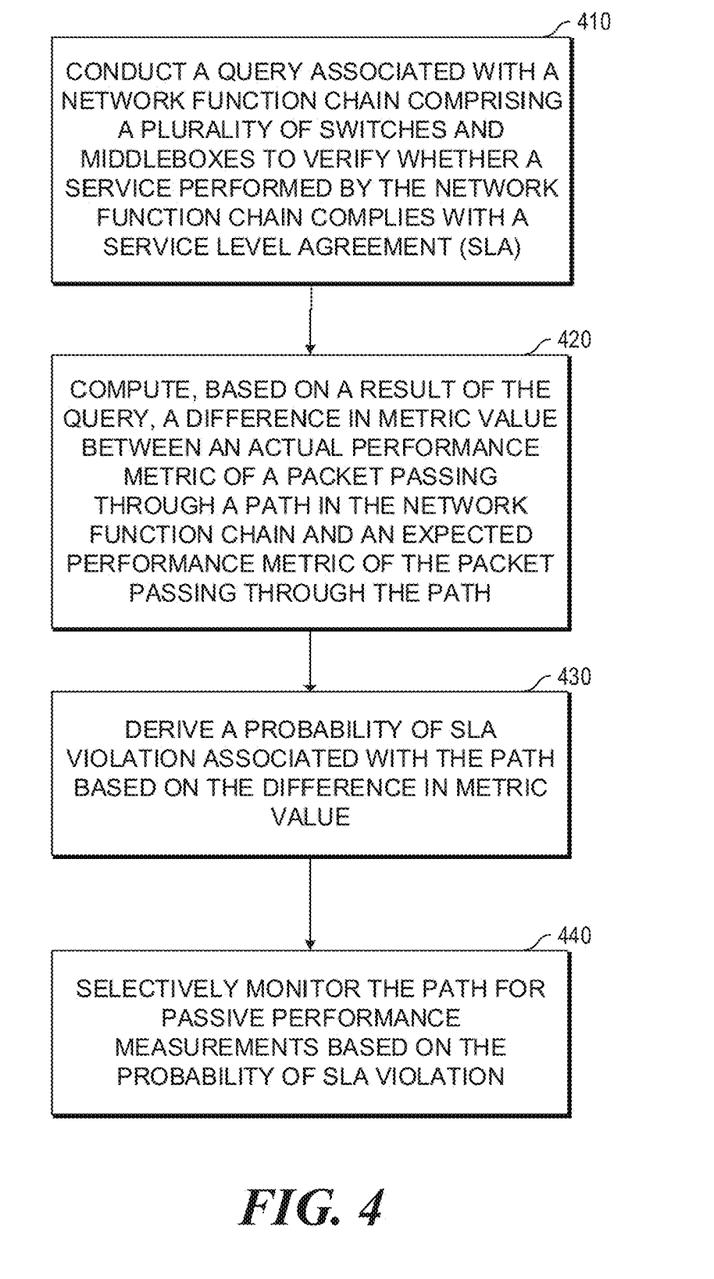
FIG. 4 is a flowchart of an example process to selectively monitor a network of network function chains based on probability of SLA violation.
Figure 5:
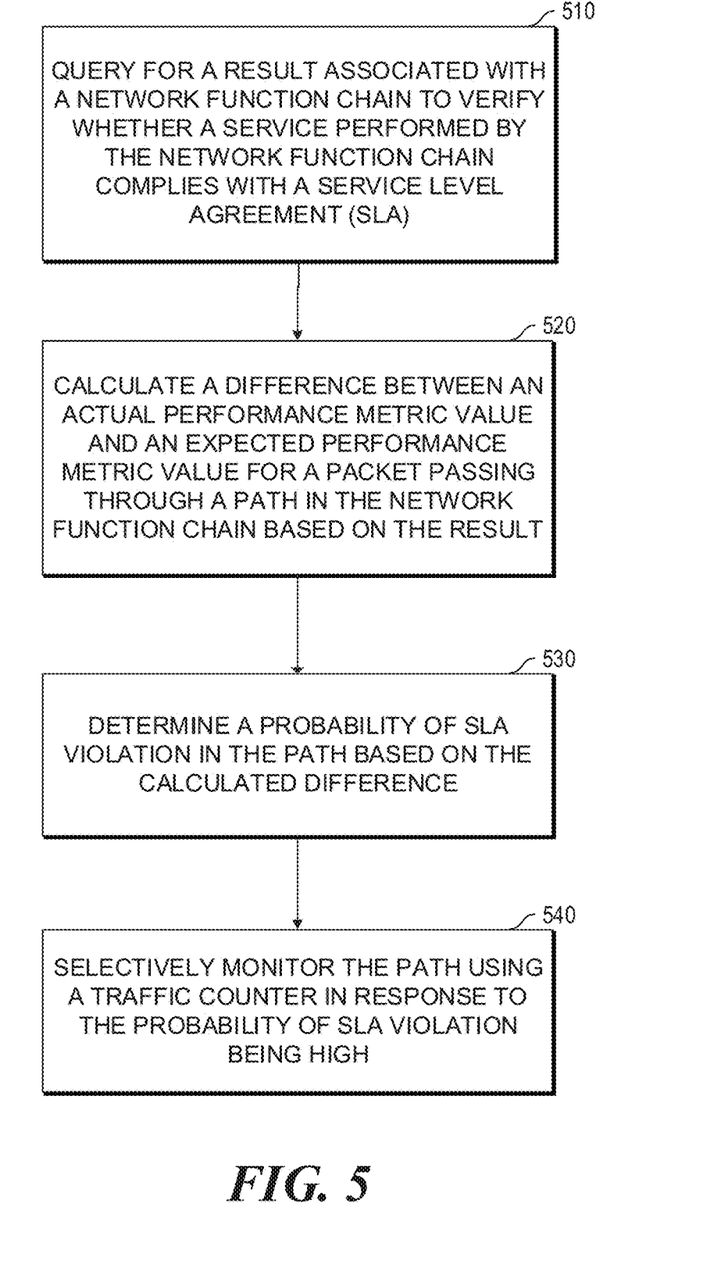
FIG. 5 is a flowchart of an example process to selectively monitor a network of network function chains based on probability of SLA violation.
Figure 6:
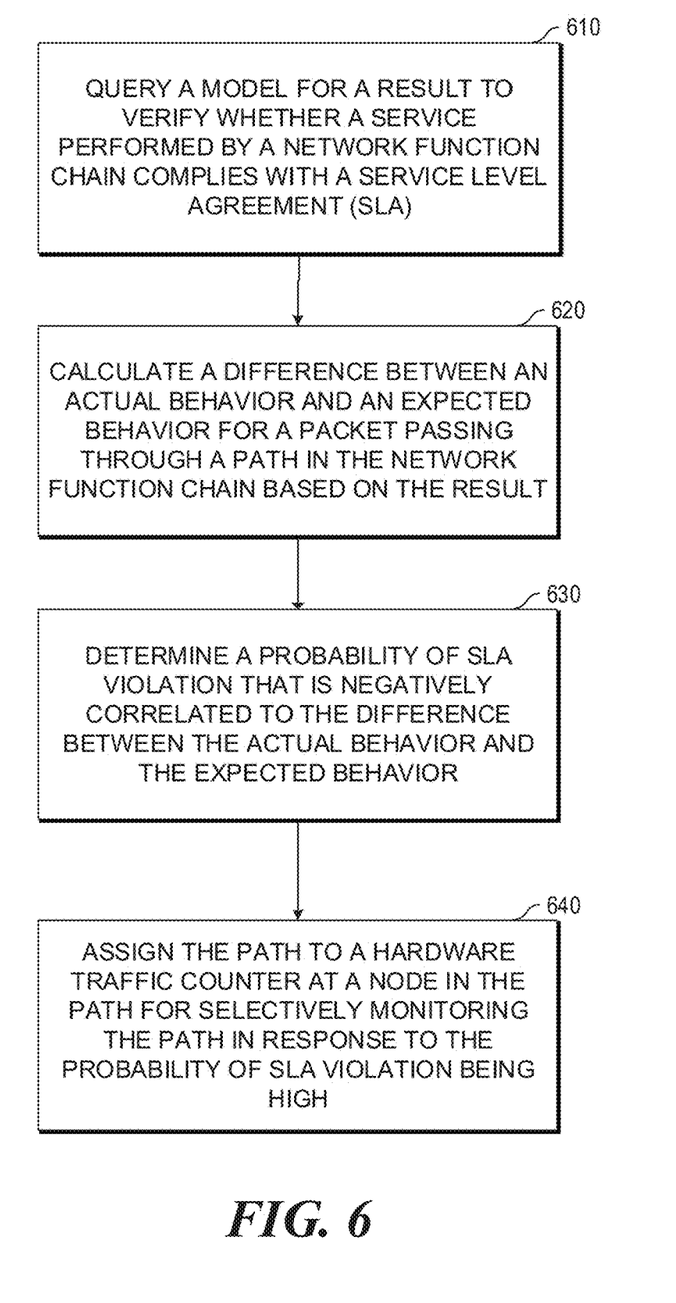
FIG. 6 is a flowchart of an example process to selectively monitor a network of network function chains based on probability of SLA violation.

In discussing FIGS. 4-6, references may be made to the components in FIGS. 1-3 to provide contextual examples. In one implementation, SLA verifier 280 and/or SLA monitor 285 described in FIG. 2 executes operations 410-440, 510-540, and 610-640 to selectively monitor a path in a network function chain. Further, although FIGS. 4-6 are described as implemented by a network device, it may be executed on other suitable devices or components. For example, FIGS. 4-6 may be implemented in the form of executable instructions on a machine-readable storage medium 720 as in FIG. 7.

FIG. 4 is a flowchart of an example process to selectively monitor a network of network function chains. First, a network device may conduct a query associated with a network function chain that includes a plurality of switches and middleboxes to verify whether a service performed by the network function chain complies with a Service Level Agreement (SLA) (operation 410). Moreover, the network device can compute, based on a result of the query, a difference in metric value between an actual performance metric of a packet passing through a path in the network function chain and an expected performance metric of the packet passing through the path (operation 420). Next, the network device may derive a probability of SLA violation associated with the path based on the difference in metric value (operation 430). Furthermore, the network device can selectively monitor the path for passive performance measurements based on the probability of SLA violation (operation 440).

FIG. 5 is a flowchart of another example process to selectively monitor a network of network function chains. In this example, the network device first queries for a result associated with a network function chain to verify whether a service performed by the network function chain complies with a Service Level Agreement (SLA) (operation 510). Then, the network device can calculate a difference between an actual performance metric value and an expected performance metric value for a packet passing through a path in the network function chain based on the result (operation 520). Further, the network device can then determine a probability of SLA violation in the path based on the calculated difference (operation 530). Finally, the network device can selectively monitor the path using a traffic counter in response to the probability of SLA violation being high (operation 540).

FIG. 6 is a flowchart of yet another example process to selectively monitor a network of network function chains. Here, the network device first queries a model for a result to verify whether a service performed by a network function chain complies with a Service Level Agreement (SLA) (operation 610). Next, the network device calculates a difference between an actual behavior and an expected behavior for a packet passing through a path in the network function chain based on the result (operation 620). Then, the network device can determine a probability of SLA violation that is negatively correlated to the difference between the actual behavior and the expected behavior (operation 630). Furthermore, the network device can assign the path to a hardware traffic counter at a node in the path for selectively monitoring the path in response to the probability of SLA violation being high (operation 640).

In some implementations, the probability of SLA violation can be negatively correlated to the difference in value between the actual performance metric of the packet passing through the path and the expected performance metric.

In some implementations, the network device can select the path associated with a high probability of SLA violation, and then determine whether the path associated with the high probability of SLA violation is assigned to a traffic counter. If the path has not been assigned to a traffic counter, the network device can assign a traffic counter to measure performance of the path.

In some implementations, the network device can identify a first node in the path associated with a first high probability of SLA violation, and then determine whether the first node has an available traffic counter. If the first node has an available traffic counter, the network device can assign the available traffic counter at the first node to measure the performance of the path.

If, however, the first node does not have any available traffic counter, the network device can then identify a second node in the path associated with a second high probability of SLA violation. Here, the first high probability may be greater than the second high probability. Then, the network device can determine whether the second node has the available traffic counter. If the second node has an available traffic counter, the network device can assign the available traffic counter at the second node to measure the performance of the path. Likewise, the network device can iterate through the other nodes with lower probability of SLA violations in the path in a similar fashion.

If no traffic counter is available in any node in the path, initiating an end-to-end probe for measuring the performance of the path. Note that the traffic counter here generally includes a hardware component of the network device to measure a first performance metric of network traffic passing through the path in the network function chain.

In some implementations, if the probability of SLA violation associated with the path is high, the network device can determine whether a network node in the path exceeds a predetermined threshold for high frequency measurements. If the network node does not exceed the predetermined threshold, the network device can assign the measurement frequency for the path to a high frequency. If the network node exceeds the pre-determined threshold, the network device can assign the measurement frequency for the path to a low frequency. The measurement frequency here generally indicates (a) how frequently the traffic counter is allowed to be polled, or (b) how frequently end-to-end probes are allowed to be initiated to monitor the path. Hence, the network device can use a combination of passive performance measurements and end-to-end probes.

Network Device to Selectively Monitor a Network of Network Function Chains

Figure 7:
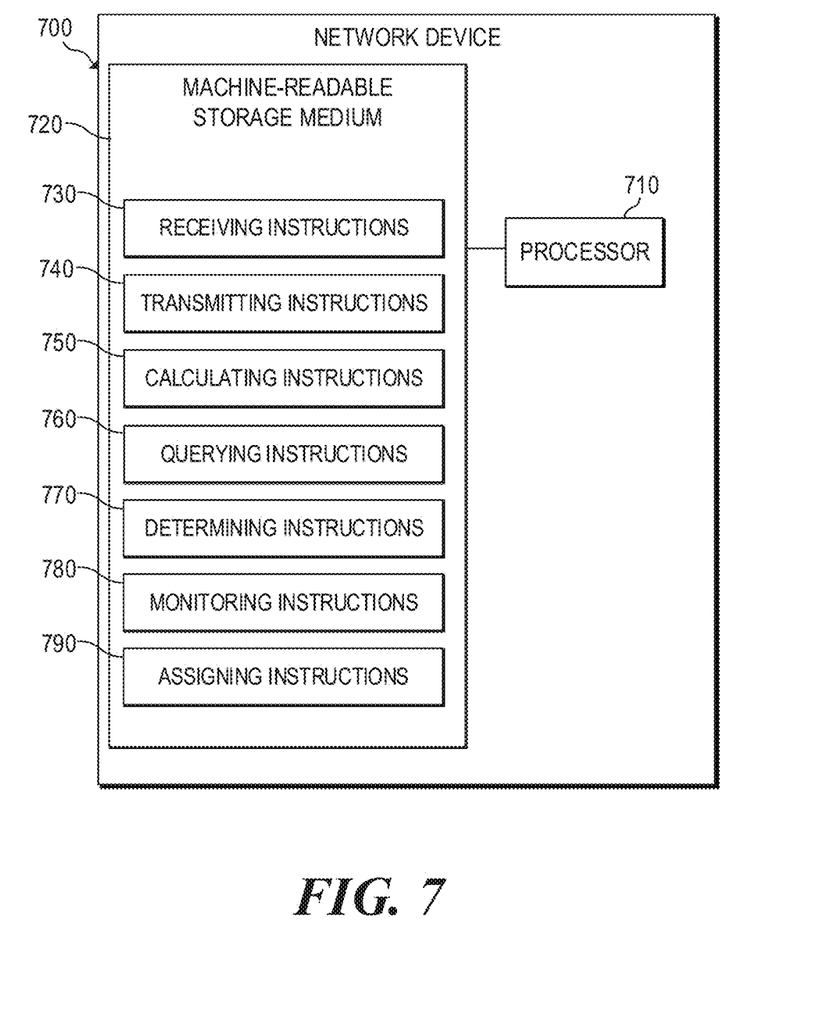
FIG. 7 is a block diagram of an example network device to selectively monitor a network of network function chains based on probability of SLA violation.

FIG. 7 is a block diagram of an example network device with at least one processor 710 to execute instructions 730-790 within a machine-readable storage medium 720 to selectively monitor a network of network function chains. As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

Although the network device 700 includes at least one processor 710 and machine-readable storage medium 720, it may also include other components that would be suitable to one skilled in the art. For example, network device 700 may include an additional processing component and/or storage. In another implementation, the network device executes instructions 730-790. Network device 700 is an electronic device with the at least one processor 710 capable of executing instructions 730-790, and as such implementations of network device 700 include a mobile device, server, data center, networking device, client device, computer, or other type of electronic device capable of executing instructions 730-790. The instructions 730-790 may be implemented as methods, functions, operations, and other processes implemented as machine-readable instructions stored on the storage medium 720, which may be non-transitory, such as hardware storage devices (e.g., random access memory (RAM), read only memory (ROM), erasable programmable ROM, electrically erasable ROM, hard drives, and flash memory).

The at least one processor 710 may fetch, decode, and execute instructions 730-790 to verify a network function by inquiring a model using a query language. Specifically, the at least one processor 710 executes instructions 730-790 to: conduct a query associated with a network function chain comprising a plurality of switches and middleboxes to verify whether a service performed by the network function chain complies with a Service Level Agreement (SLA); compute, based on a result of the query, a difference in metric value between an actual performance metric of a packet passing through a path in the network function chain and an expected performance metric of the packet passing through the path; derive a probability of SLA violation associated with the path based on the difference in metric value; selectively monitor the path for passive performance measurements based on the probability of SLA violation; select a path associated with a high probability of SLA violation; determine whether the path associated with the high probability of SLA violation is assigned to a traffic counter; assign a traffic counter to measure performance of the path in response to the path not being assigned to the traffic counter; etc.

Moreover, the at least one processor 710 can also execute instructions 730-790 to: identify a first node in the path associated with a first high probability of SLA violation; determine whether the first node has an available traffic counter; assign the available traffic counter at the first node to measure the performance of the path in response to the first node having the available traffic counter; identify a second node in the path associated with a second high probability of SLA violation in response to the first node not having the available traffic counter; determine whether the second node has the available traffic counter; assign the available traffic counter at the second node to measure the performance of the path in response to the second node having the available traffic counter; initiate an end-to-end probe for measuring the performance of the path in response to no traffic counter being available in nodes in the path; determine whether a network device exceeds a predetermined threshold for high frequency measurements in response to the probability of SLA violation associated with the path being high; assign the measurement frequency for the path to a high frequency in response to the network device not exceeding the predetermined threshold; assign the measurement frequency for the path to a low frequency in response to the network device exceeding the predetermined threshold; etc.

The machine-readable storage medium 720 includes instructions 730-790 for the processor 710 to fetch, decode, and execute. In another example, the machine-readable storage medium 720 may be an electronic, magnetic, optical, memory, storage, flash-drive, or other physical device that contains or stores executable instructions. Thus, the machine-readable storage medium 720 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 720 may include an application and/or firmware which can be utilized independently and/or in conjunction with the at least one processor 710 to fetch, decode, and/or execute instructions of the machine-readable storage medium 720. The application and/or firmware may be stored on the machine-readable storage medium 720 and/or stored on another location of the network device 700.

We claim:

1. A method comprising:
   conducting, by a network device, a query associated with a network function chain comprising a plurality of switches and middleboxes to verify whether a service performed by the network function chain complies with a Service Level Agreement (SLA);

computing, by the network device, based on a result of the query, a difference in metric value between an actual performance metric of a packet passing through a path in the network function chain and an expected performance metric of the packet passing through the path;

deriving, by the network device, a probability of SLA violation associated with the path based on the difference in metric value;

selecting, by the network device, the path whose derived probability of SLA violation is high; and selectively monitoring, by the network device, a network of network function chains at least by assigning a traffic counter to a set of nodes in the path to collect passive performance measurements.

2. The method of claim 1, wherein the probability of SLA violation is negatively correlated to the difference in value between the actual performance metric of the packet passing through the path and the expected performance metric.

3. The method of claim 1, wherein selectively monitoring the path for passive performance measurements based on the probability of SLA violation future comprising:

determining whether the selected path is assigned to a traffic counter; and in response to the selected path not being assigned to the traffic counter, assigning the traffic counter to measure performance of the path.

4. The method of claim 3, further comprising:

identifying a first node in the path associated with a first high probability of SLA violation;

determining whether the first node has an available traffic counter; and in response to the first node having the available traffic counter, assigning the available traffic counter at the first node to measure the performance of the path.

5. The method of claim 4, further comprising:

in response to the first node not having the available traffic counter, identifying a second node in the path associated with a second high probability of SLA violation, wherein the first high probability being greater than the second high probability;

determining whether the second node has the available traffic counter; and in response to the second node having the available traffic counter, assigning the available traffic counter at the second node to measure the performance of the path.

6. The method of claim 5, further comprising:

in response to no traffic counter being available in nodes in the path, initiating an end-to-end probe for measuring the performance of the path.

7. The method of claim 3, wherein the traffic counter comprises a hardware component of the network device to measure a first performance metric of network traffic passing through the path in the network function chain.

8. The method of claim 1, further comprising:

in response to the probability of SLA violation associated with the path being high, determining whether the network device exceeds a predetermined threshold for high frequency measurements;

in response to the network device not exceeding the predetermined threshold, assigning the measurement frequency for the path to a high frequency; and in response to the network device exceeding the predetermined threshold, assigning the measurement frequency for the path to a low frequency.

9. The method of claim 8, wherein the measurement frequency indicates (a) how frequently the traffic counter is allowed to be polled, or (b) how frequently end-to-end probes are allowed to be initiated to monitor the path.

10. The method of claim 1, wherein the network device uses a combination of passive performance measurements and end-to-end probes.

11. A system comprising at least a memory and a processor coupled to the memory, the processor executing instructions stored in the memory to:

query for a result associated with a network function chain to verify whether a service performed by the network function chain complies with a Service Level Agreement (SLA);

calculate a difference between an actual performance metric value and an expected performance metric value for a packet passing through a path in the network function chain based on the result;

determine a probability of SLA violation in the path based on the calculated difference;

select the path whose derived probability of SLA violation is high; and selectively monitor a network of network function chains at least by assigning a traffic counter to a set of nodes in the path to collect passive performance measurements.

12. The system of claim 11, wherein the probability of SLA violation is negatively correlated to the difference between the actual performance metric value and the expected performance metric value.

13. The system of claim 11, wherein the processor further executing instructions stored in the memory to:

determine whether the selected path is assigned to the traffic counter; and assign the traffic counter to measure performance of the path in response to the selected path not being assigned to the traffic counter.

14. The system of claim 13, wherein the processor further executing instructions stored in the memory to:

identify a first node in the path associated with a first high probability of SLA violation;

determine whether the first node has an available traffic counter; and assign the available traffic counter at the first node to measure the performance of the path in response to the first node having the available traffic counter.

15. The system of claim 14, wherein the processor further executing instructions stored in the memory to:

identify a second node in the path associated with a second high probability of SLA violation in response to the first node not having the available traffic counter, wherein the first high probability being greater than the second high probability;

determine whether the second node has the available traffic counter;

assign the available traffic counter at the second node to measure the performance of the path in response to the second node having the available traffic counter; and assign an end-to-end probe for measuring the performance of the path in response to no traffic counter being available in nodes in the path.

16. The system of claim 11, wherein the processor further executing instructions stored in the memory to:

determine whether the network device exceeds a predetermined threshold for high frequency measurements in response to the probability of SLA violation associated with the path being high;

assign the measurement frequency for the path to a high frequency in response to the network device not exceeding the predetermined threshold; and assign the measurement frequency for the path to a low frequency in response to the network device exceeding the predetermined threshold.

17. The system of claim 16, wherein the measurement frequency indicates (a) how frequently the traffic counter is allowed to be polled, or (b) how frequently end-to-end probes are allowed to be initiated to monitor the path.

18. A non-transitory machine-readable storage medium encoded with instructions executable by at least one processor of a network device, the machine-readable storage medium comprising instructions to:

query a model for a result to verify whether a service performed by a network function chain complies with a Service Level Agreement (SLA);

calculate a difference between an actual behavior and an expected behavior for a packet passing through a path in the network function chain based on the result;

determine a probability of SLA violation that is negatively correlated to the difference between the actual behavior and the expected behavior;

selecting, by the network device, the path whose derived probability of SLA violation is high; and assign the path to a hardware traffic counter at a node in the path to collect passive performance measurements for selectively monitoring a network of network function chains in response to the probability of SLA violation being high.

19. The non-transitory machine-readable storage medium of claim 18, wherein the machine-readable storage medium further comprising instructions to:

assign an end-to-end probe for measuring performance of the path in response to no hardware traffic counter being available in nodes in the path.

20. The non-transitory machine-readable storage medium of claim 18, wherein the machine-readable storage medium further comprising instructions to:

assign a measurement frequency for the path to a high frequency in response to the node in the path not exceeding a predetermined threshold of high measurement frequency;

assign the measurement frequency for the path to a low frequency in response to the node in the path exceeding the predetermined threshold, wherein the measurement frequency indicates how frequently the hardware traffic counter is polled.

* * * * *